2 Sheets—Sheet 1.

A. F. W. PARTZ,

Assignor, by mesne assignments, to the BLAKE CRUSHER Co.

Ore-Crusher.

No. 8,893. Reissued Sept. 16, 1879.

Witnesses.

J. H. Shumway.

Jos. C. Earle

August F. W. Partz.

Inventor.

By atty

Wm. C. Earle

THE NORRIS PETERS CO., PHOTO-LITHO., WASHINGTON, D. C.

2 Sheets—Sheet 2.

A. F. W. PARTZ,

Assignor, by mesne assignments, to the BLAKE CRUSHER Co.

Ore-Crusher

No. 3,893. Reissued Sept. 16, 1879.

Witnesses.

J. H. Chumney

Jos. C. Earle

August F. W. Partz.
Inventor.

By atty.

Wm. C. Earle

THE NORRIS PETERS CO. PHOTO-LITHO. WASHINGTON, D. C.

UNITED STATES PATENT OFFICE.

AUGUST F. W. PARTZ, OF PHILADELPHIA, PENNSYLVANIA, ASSIGNOR, BY MESNE ASSIGNMENTS, TO THE BLAKE CRUSHER COMPANY, OF NEW HAVEN, CONNECTICUT.

IMPROVEMENT IN ORE-CRUSHERS.

Specification forming part of Letters Patent No. 44,450, dated September 27, 1864; Reissue No. 8,893, dated September 16, 1879; application filed June 18, 1879.

*To all whom it may concern:*

Be it known that I, AUGUST F. W. PARTZ, of Philadelphia, in the county of Philadelphia and State of Pennsylvania, have invented a new Improvement in Ore-Crushers; and I do hereby declare the following, when taken in connection with the accompanying drawings and the letters of reference marked thereon, to be a full, clear, and exact description of the same, and which said drawings constitute part of this specification, and represent, in—

Figure 1:
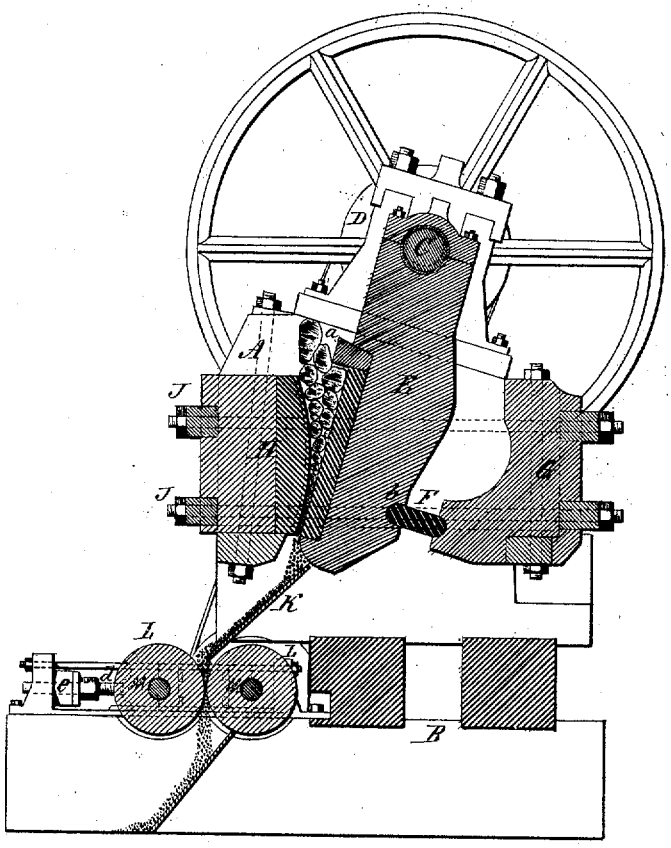
Figure 2:
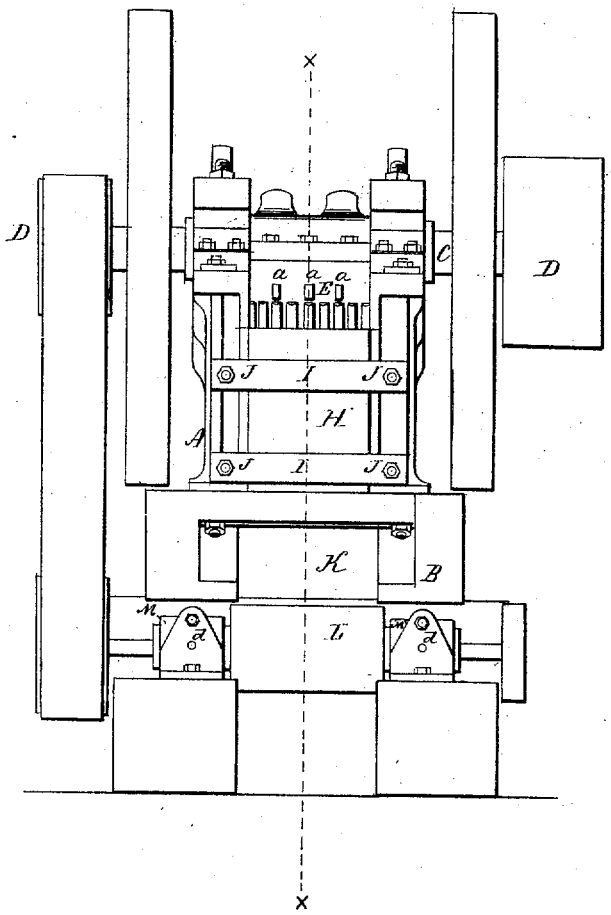

Figure 1, a longitudinal vertical section in the plane indicated by the line *x x*, Fig. 2; Fig. 2, a front elevation of the same.

This invention relates to an improvement in that class of ore-crushers in which two jaws are employed, power being applied to one to crush the ore or other material introduced between them, the object being to give to the movable jaw a combined crushing and grinding effect; and it consists in imparting to the movable jaw a combined vibrating and reciprocating movement, as more fully hereinafter described.

In the drawings illustrating this invention, A represents a frame, made of cast-iron or any other suitable material of sufficient strength for the occasion, and supported on a foundation, B, composed of blocks of wood, or built up of stone or any other suitable material. This frame forms the bearings for the shaft C, which extends far enough beyond the same to make room for band-wheels D, and, if desired, for fly-wheels, (one on either side of the frame.) That portion of the shaft C which is situated between the two side pieces of the frame is eccentric with its journals, and suspended from said eccentric portion of the shaft is the crushing-jaw E. This crushing-jaw consists of a heavy piece of cast-iron with a face of chilled cast-iron, or other suitable hard material, which is secured to the body of the jaw by wedges *a*, or other means, in such a manner that the same can be readily removed when worn, and replaced by a new one without affecting the body of the jaw.

The lower end of the jaw E is supported by a link, F, one end of which rests in a semicircular cavity, *b*, in the back of said jaw, while its opposite end is supported in a similar cavity, *c*, in the rigid end piece, G, of the frame A.

The crushing of the ore or other material is effected between the movable jaw E and the stationary jaw H. This latter jaw, like the movable jaw, is composed of two parts—viz., its cast-iron body and its removable chilled face, which is to be replaced when worn—and it (the jaw) is held in position by cross-bars I and screw-bolts J. By means of these screw-bolts and cross-bars, the stationary jaw H can be adjusted toward and from the movable jaw, according to the state of fineness to which the ore or other material is to be reduced by the crushing-jaws.

The degree of fineness to which the ore or other material is reduced naturally depends upon the size of the opening at the point of exit of the ore or other material, or upon the distance between the lower edges of the crushing-jaws. If this discharge-opening increases when the jaws open, unbroken lumps, larger than the requisite size, drop out from between the jaws; but in my crusher the link F and the eccentric-shaft C are combined with the movable crushing-jaw in such a manner that the opening at the point of exit of the ore or other material will remain uniform for all practical purposes. The position of the movable jaw and the size of said opening depend solely upon the position of the stationary jaw as previously stated.

By the action of the eccentric-shaft C a combined vibrating and reciprocating motion is imparted to the movable jaw E, producing a combined crushing and grinding, which considerably facilitates the operation of crushing quartz or other hard materials.

The ore or other material, on being discharged from the crushing-jaws, drops down upon the inclined apron K, which conducts the same to the smooth crushing-rollers L. These rollers have their bearings in suitable boxes M M′, secured to the bottom timbers of the foundation B. The boxes M of one of these rollers are movable in suitable guides, and they are adjusted toward and from the two other boxes M′ by two set-screws, *d*, and they are rendered yielding by interposed springs *e*, of india-rubber or other suitable material, so that in case a large lump or some hard material should by accident get between the two rollers, breakage or injury to the machinery is avoided.

The crushed ore or other material, on being discharged from the rollers L, is collected in a suitable receptacle placed underneath; or, if desired, it may at once be conducted to the desulphurizer or to the amalgamator.

I claim—

1. In an ore-crusher, the combination of two jaws with mechanism, substantially such as described, for imparting to one of said jaws both a vibrating and reciprocating movement, and by such movement to work in conjunction with the other jaw to produce a combined crushing and grinding, substantially as described.

2. The horizontally-adjustable jaw H, in combination with the movable jaw E, supported by the rocking rear support, F, substantially as described.

AUGUST F. W. PARTZ.

Witnesses:

GEO. H. SCIDMORE,

DAVID T. S. FULLER.